United States Patent
Jess et al.

(10) Patent No.: US 8,659,651 B2
(45) Date of Patent: Feb. 25, 2014

(54) SURGICAL MICROSCOPE FOR OBSERVING AN INFRARED FLUORESCENCE AND CORRESPONDING METHOD

(75) Inventors: Helge Jess, Oberkochen (DE); Dieter Quendt, Esslingen (DE); Werner Nahm, Buehlerzell (DE); Joachim Steffen, Westhausen (DE)

(73) Assignee: Carl Zeiss Meditec AG, Jena (DE)

( * ) Notice: Subject to any disclaimer, the term of this patent is extended or adjusted under 35 U.S.C. 154(b) by 779 days.

(21) Appl. No.: 12/639,804

(22) Filed: Dec. 16, 2009

(65) Prior Publication Data

US 2010/0182418 A1 Jul. 22, 2010

(30) Foreign Application Priority Data

Dec. 17, 2008 (DE) .......... 10 2008 062 650

(51) Int. Cl.
*H04N 7/18* (2006.01)
*G02B 21/00* (2006.01)

(52) U.S. Cl.
USPC ........................................... 348/79; 359/368

(58) Field of Classification Search
USPC ........................................... 348/79; 359/368
See application file for complete search history.

(56) References Cited

U.S. PATENT DOCUMENTS

| | | | |
|---|---|---|---|
| 4,045,772 A * | 8/1977 | Bouton et al. ............... | 382/134 |
| 5,507,287 A | 4/1996 | Palcic et al. | |
| 5,590,660 A | 1/1997 | MacAulay et al. | |
| 5,682,038 A | 10/1997 | Hoffman | |
| 5,827,190 A | 10/1998 | Palcic et al. | |
| 6,198,147 B1 | 3/2001 | Connolly | |
| 6,899,675 B2 | 5/2005 | Cline et al. | |
| 7,580,185 B2 * | 8/2009 | Haisch et al. ............... | 359/385 |
| 7,645,971 B2 * | 1/2010 | Gouch ..................... | 250/201.2 |
| 7,720,272 B2 * | 5/2010 | Armogida ................. | 382/133 |
| 2002/0103439 A1 * | 8/2002 | Zeng et al. ................. | 600/476 |
| 2004/0109231 A1 | 6/2004 | Haisch et al. | |
| 2007/0077609 A1 | 4/2007 | Gambhir et al. | |
| 2008/0251694 A1 * | 10/2008 | Tanimoto et al. .......... | 250/208.1 |
| 2009/0292168 A1 * | 11/2009 | Farr ......................... | 600/109 |
| 2010/0182418 A1 * | 7/2010 | Jess et al. ................... | 348/79 |

FOREIGN PATENT DOCUMENTS

| | | |
|---|---|---|
| DE | 695 18 915 T2 | 4/2001 |
| DE | 696 23 523 T2 | 7/2003 |
| DE | 103 39 784 A2 | 3/2004 |
| DE | 102 51 151 A2 | 5/2004 |
| DE | 10 2005 005 253 A3 | 11/2005 |
| DE | 698 34 963 T2 | 1/2007 |
| DE | 10 2008 004 596 A1 | 6/2008 |
| EP | 0 820 104 A2 | 1/1998 |
| EP | 1 731 087 A2 | 12/2006 |
| EP | 1 403 675 A2 | 1/2007 |

(Continued)

OTHER PUBLICATIONS

European Search Report and Search Opinion of EP Patent Application No. 09015577.1, mailed Mar. 17, 2010, 7 pages total.

(Continued)

*Primary Examiner* — Backhean Tiv
(74) *Attorney, Agent, or Firm* — Potomac Patent Group PLLC

(57) ABSTRACT

A surgical microscope for observing an infrared fluorescence includes a camera system 25 having three chips, wherein infrared light emanating from an object is supplied to only one of the three camera chips via a dichroic beam splitter.

17 Claims, 4 Drawing Sheets

(56) References Cited

FOREIGN PATENT DOCUMENTS

| | | |
|---|---|---|
| EP | 2 075 616 A1 | 1/2009 |
| GB | 2 254 417 | 7/1992 |
| JP | 2004-520105 A | 7/2004 |
| WO | WO 94/18593 | 8/1994 |
| WO | 99/01749 | 1/1999 |
| WO | 02/50518 A2 | 6/2002 |
| WO | WO 2005/034747 A1 | 4/2005 |
| WO | 2007/085496 A1 | 8/2007 |

OTHER PUBLICATIONS

European Office Action issued in corresponding European Application No. 09 015 577.1 dated Jan. 7, 2013.
Japanese Office Action in corresponding Japanese Application No. 2009-286310 mailed Oct. 8, 2013.
US 6,692,429, 02/2004, Imaizumi et al. (withdrawn)

* cited by examiner

SURGICAL MICROSCOPE FOR OBSERVING AN INFRARED FLUORESCENCE AND CORRESPONDING METHOD

CROSS-REFERENCES TO RELATED APPLICATIONS

The present application claims priority to German Patent Application No. 10 2008 062 650.3, filed Dec. 17, 2008, entitled "Surgical microscope for observing an infrared fluorescence and corresponding method," the contents of which is hereby incorporated by reference in its entirety.

BACKGROUND OF THE INVENTION

The invention relates to a surgical microscope for observing an infrared fluorescence and a microscopy method for observing an infrared fluorescence.

Fluorescent dyes are used in medical applications and biology for various purposes, such as visualizing particular types of tissue, tissue structures, tissue functions, tissue perfusion and other purposes. Herein, a fluorescent dye or a precursor of such fluorescent dye is applied to a tissue sample or a patient under examination. The dye or the precursor, respectively, accumulates in particular types of tissue and tissue structures of the tissue sample or the patient, respectively. The tissue may be illuminated with excitation light for exciting a fluorescence, and fluorescence light produced herein due to fluorescence occurring in the fluorescent dye may be detected so as to visualize particular tissue structures, types of tissue and tissue perfusion. A surgical microscope can be used to illuminate an object with excitation light and to detect fluorescence light.

A conventional surgical microscope comprises a first camera system for obtaining normal light images of an object, and a second camera system for obtaining fluorescence light images of the object.

One example of a fluorescent dye is indocyanine green (ICG) having a fluorescence spectrum in the range of infrared light.

SUMMARY OF THE INVENTION

The present invention has been accomplished taking the above technical problems into consideration.

It is an object of the present invention to provide a surgical microscope method allowing detection of fluorescence images.

It is a further object of the present invention to provide a microscopy method allowing detection of fluorescence images and normal light images.

According to embodiments, a camera system comprises an input port, a dichroic beam splitter and first, second and third camera chips, wherein the dichroic beam splitter is configured to direct red light received at the input port mainly towards the first camera chip via a first output port of the beam splitter, to direct green light received at the input port mainly towards the second camera chip via a second output port of the beam splitter, to direct blue light received at the input port mainly towards the third camera chip via a third output port of the beam splitter, and to direct infrared light received at the input port mainly only towards one of the first, second and third camera chips.

A conventional camera system including three chips for obtaining normal light images has a similar structure which is still different from the structure illustrated above. The conventional camera has a dichroic beam splitter configured to direct red, green and blue light to respective camera chips. The conventional camera further includes an infrared blocking filter to prevent detection of infrared light which is outside of the visible wavelength range. Properties of the dichroic beam splitter of the conventional camera are not defined with respect to infrared light.

However, in the embodiment described above, the properties of the dichroic beam splitter are defined such that the infrared light is supplied to merely one of the three camera chips. Compared to an embodiment, where infrared light is supplied to plural camera chips via the dichroic beam splitter, a comparatively good signal to noise ratio can be achieved by supplying the infrared light to merely one camera chip when detecting infrared light having a low intensity.

In the context of the present application, the definition that light of a particular wavelength is "mainly" supplied to one particular camera chip means that, in a situation where merely the light of the particular wavelength is supplied to the input port of the dichroic beam splitter, the particular camera chip detects an intensity which is substantially higher that an intensity of the particular wavelength detected by the other two camera chips together. For example, the intensity detected by the particular camera can be 1.8 times higher, or 2.5 or 3.0 times higher, than the sum of intensities detected by the two other cameras.

According to an embodiment, the dichroic beam splitter is configured such that the infrared light is mainly supplied to one of those camera chips to which the red light is not mainly supplied to. According to exemplary embodiments herein, the infrared light is mainly supplied to that camera chip to which also the green light is mainly supplied to. According to another exemplary embodiment, the infrared light is supplied to that camera chip to which also the blue light is supplied to.

In the context of the present application, blue light is light of a wavelength range from about 440 nm to about 490 nm, green light is light of a wavelength range from about 520 nm to about 570 nm, red light is light of a wavelength range from about 625 nm to about 740 nm, and infrared light is light of a wavelength range from about 800 nm to about 930 nm.

According to embodiments, surgical microscope comprises a first blocking filter which can be selectively disposed in an imaging beam path upstream of the dichroic beam splitter. The first blocking filter has a substantially higher transmittance for red, green and blue light than for infrared light. For example, the transmittance for red, green or blue light is ten times higher than the transmittance for infrared light. Infrared light is substantially blocked by the first blocking filter. In a first mode of operation, in which the first blocking filter is disposed in the beam path, the camera system is well suited to obtain normal light images, and in a second mode of operation, in which the first blocking filter is not disposed in the beam path, the camera system is suited to obtain infrared images.

According to embodiments, the camera system comprises a second blocking filter which can be selectively disposed in a beam path upstream of the dichroic beam splitter. The second blocking filter substantially blocks that light which is mainly supplied to that camera chip to which also the infrared light is supplied to.

In exemplary embodiments herein, the surgical microscope comprises an actuating system configured to position either the first blocking filter or the second blocking filter in the beam path. In the first mode of operation, in which the first blocking filter is positioned in the beam path, the camera system is capable to obtain normal light images, and in the second mode of operation, in which the first blocking filter is not disposed in the beam path, the camera system is capable to simultaneously obtain normal light images and infrared images.

According to embodiments, a surgical microscope comprises microscopy optics for optically imaging an object area onto at least one camera chip of a camera system to generate images of the object area, a display system to display the images to a user, and an illumination system to supply at least one illumination light beam to the object area. The camera system may be configured as illustrated above. The microscopy optics may be optics providing a variable magnification and/or a variable working distance. The microscopy optics may further provide a monoscopic or a stereoscopic beam path. The microscopy optics may further comprise one or more oculars into which a user may look in order to perceive an image of the object area. The display system displays images obtained by the camera system. The display system may comprise a cathode ray tube, an LCD display, an active matrix display and the like. The display system may be a head mounted display which can be attached to a head of a user. The display system may also be configured to display the images via oculars of the microscopy optics.

According to an embodiment, the microscope comprises a third blocking filter which can be selectively positioned in a beam path of an illumination beam. The third blocking filter blocks that light which is mainly supplied to that camera chip to which also the infrared light is supplied to. In an exemplary embodiment herein, there is provided an actuating system configured to position either the first blocking filter in the imaging beam path or the third blocking filter in the beam path of the illumination beam.

According to embodiments, a microscopy method comprises operating a surgical microscope in a first mode of operation and in a second mode of operation. In the first mode of operation, light comprising red, green and blue light is supplied to an object, and red, green and blue light emanating from the object is supplied to three camera chips, such that the three camera chips together may obtain a normal light image of the object. Herein, a filter blocking infrared light may be positioned in a beam path of the light, so as to prevent infrared light from being supplied to on one of the three camera chips, even if it is contained in light emanating from the object.

In the second mode of operation, light including light of a wavelength range from about 700 nm to about 790 nm is supplied to the object, and infrared light emanating from the object is mainly supplied to merely one of the three camera chips. If a filter blocking infrared light is positioned in the beam path in the first mode of operation, this filter is removed from the beam path in the second mode of operation.

According to exemplary embodiments, light with wavelengths greater than about 700 nm and smaller than about 805 nm is blocked upstream of the three camera chips in the second mode of operation.

According to exemplary embodiments, one of red light, green light and blue light is blocked upstream of the three camera chips in the second mode of operation.

According to further exemplary embodiments, at most two of red light, green light and blue light are supplied to the object in the second mode of operation.

According to an exemplary embodiment, a fluorescence of a fluorescent dye or a precursor of a fluorescent dye is observed in the second mode of operation. The fluorescent dye or precursor thereof may comprise indocyanine green (ICG).

According to a further exemplary embodiment, in the second mode of operation, infrared light emanating from the object is supplied to that camera chip to which the blue light or the green light is supplied to in the first mode of operation.

According to a further exemplary embodiment, the microscopy method is performed only in the second mode of operation.

According to a further exemplary embodiment, the red light, the green light and the blue light may be generated by a first light source, and light in a wavelength range from about 700 nm to about 805 nm may be generated by a second light source different from the first light source. The second light source may comprise an light emitting diode (LED) or a Laser diode. Thereby it is possible to adjust an intensity of the light supplied to the object from the first light source and independently of an intensity of light supplied to the object from the second light source, allowing for an adjustment of the relative intensities depending on circumstances.

BRIEF DESCRIPTION OF THE DRAWINGS

In the following description, the present invention is explained in more detail with respect to special embodiments and in relation to the accompanying drawings, in which.

DETAILED DESCRIPTION OF SPECIFIC EMBODIMENTS

Figure 1:
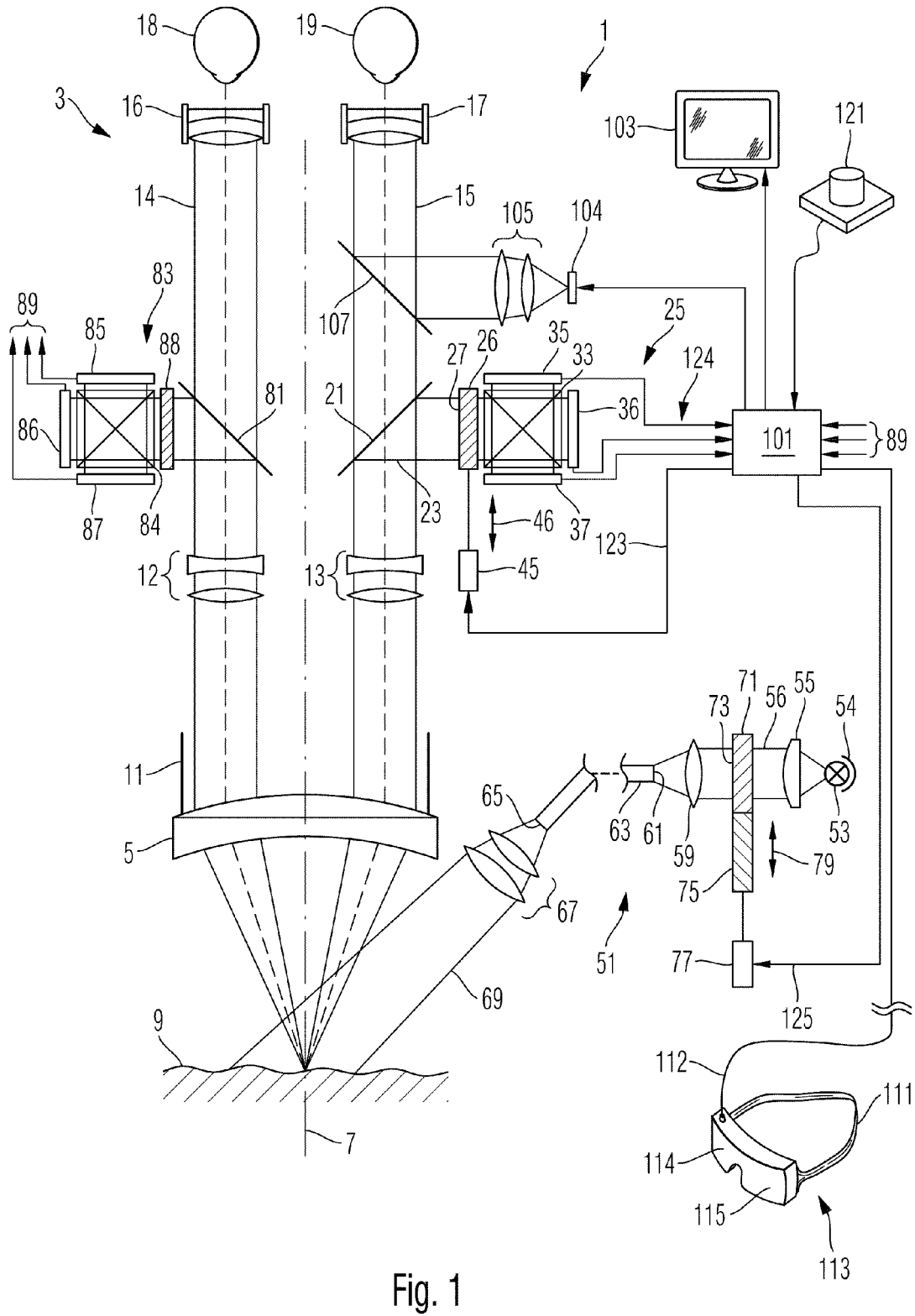
FIG. 1 shows a schematic representation of beam paths in a surgical microscope a first embodiment.

In the exemplary embodiments described below, components similar in function and structure are indicated as far as possible by similar reference numerals.

FIG. 1 shows schematically a surgical microscope 1, comprising microscopy optics 3 having an objective lens 5 having an optical axis 7. An object 9 to be observed is positioned in an object area of the objective lens 5. Light emanating from the object 9 is transformed by the objective lens 5 to form a parallel beam bundle 11 in which two zoom lens systems 12, 13 are disposed at a lateral distance from the optical axis 7. The zoom lens systems 12, 13 take respective partial beam bundles 14, 15 of the parallel beam bundle 11 and supply the partial beam bundles 13, 14 through deflection prisms, not shown in FIG. 1, to oculars 16 and 17, into which a user may look with his left eye 18 and his right eye 19 in order to perceive a magnified image of the object 9.

A partially transmissive mirror 21 is disposed in the partial beam bundle 15 to branch off a part of the light of the beam bundle 15 to form beam 23 which is supplied to a camera system 25.

In the following, the camera system 25 is described in greater detail with reference to FIG. 2. The beam 23 is incident on an input port 31 of a dichroic beam splitter 33 and is supplied to three camera chips 35, 36 and 37 depending on a wavelength of the incident light. Each camera chip 35, 36, 37 comprises a field of light sensitive elements (pixels) which provide a electronic signals depending on an intensity of light received by the elements. The camera chips may include camera chips of sensors, such as, for example, CCD image sensors and CMOS image sensors.

Figure 2:
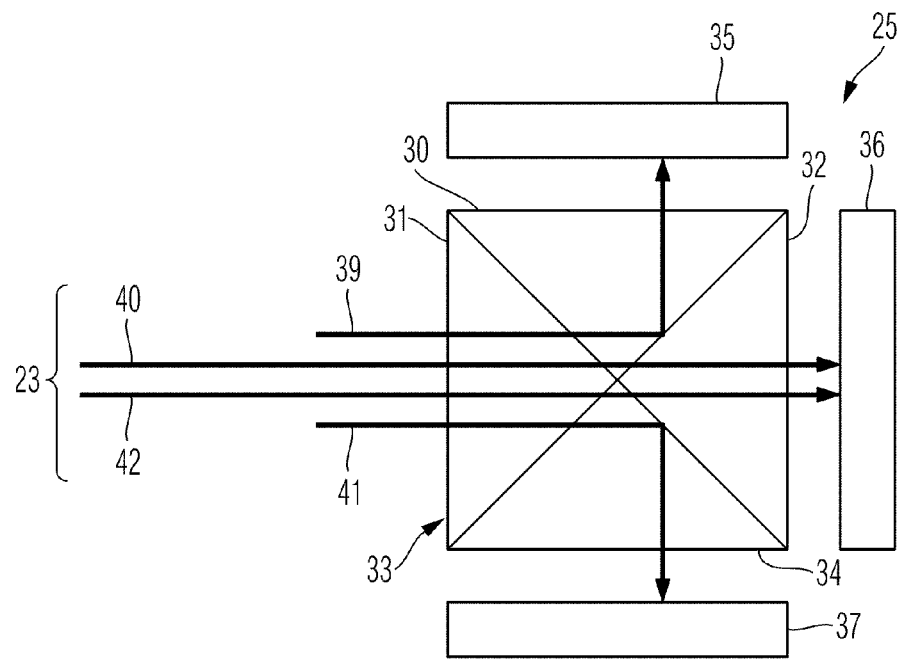
FIG. 2 shows a schematic representation of beam paths in a camera system which can be used in the surgical microscope shown in FIG. 1.

In FIG. 2, reference numeral 39 indicates an exemplary beam of red light. The red light is supplied to the camera chip 35 via an output port 30 of the dichroic beam splitter 33 such that the camera chip 35 can detect a red light image. In FIG. 2, reference numeral 40 designates an exemplary beam of green light which is supplied to the camera chip 36 via an output port 32 of the dichroic beam splitter 33 such that camera chip 36 can detect a green light image. In FIG. 2, reference numeral 41 designates an exemplary beam of blue light which is supplied to the camera chip 37 via an output port 34 of the beam splitter 33 such that the camera chip 37 can detect a blue light image. The dichroic beam splitter 33 is further also configured to supply infrared light to the camera chip 36, as shown in FIG. 2 by an exemplary infrared light beam 42 which is supplied to the camera chip 36 via the output port 32 of the dichroic beam splitter 33 such that the camera chip 36 can also detect an infrared image.

As it is shown in FIG. 1, the surgical microscope 1 comprises a filter plate 26 including a first blocking filter 27. The filter plate 26 including the first blocking filter 27 can be displaced by an actuator 45 in a direction indicated by a double arrow 46, so as to position the first blocking filter 27 either in the beam 23 or outside of the beam 23. The actuator 45 is controlled by a controller 101 via signal line 123. In the illustrated example, the first blocking filter blocks infrared light.

In a first mode of operation, which is shown in FIG. 1, of the surgical microscope 1, the first blocking filter 27 is positioned in the beam 23. In this first mode of operation, the surgical microscope 1 is configured to obtain normal light images of the object 9 by the camera system 25. Here, the object 9 is illuminated by an illumination system 51 with white light, which is light containing color components red, green and blue.

The illumination system 51 comprises a light source 53, which can be, for example, a halogen lamp, a xenon lamp or some other suitable lamp. The illumination system 51 may further comprise a reflector 54 and a collimator 55 to shape a collimated beam 56 of light supplied to an end 61 of an optical fiber bundle 63 by one or more lenses 59 in order to couple light generated by light source 53 into the fiber bundle 63. The light is transmitted by the fiber bundle 63 to a vicinity of the objective lens 5, emanates from an end 65 of the fiber bundle 63 and is collimated by collimating optics 67 to form an illumination light beam 69 which is directed to the object 9 under examination.

The illumination system 51 further comprises a filter plate 71 including two filters 73 and 75 which are disposed adjacent to each other. The two filters 73 and 75 can be displaced by an actuator 77 along a direction indicated by the double arrow 79 in FIG. 1, so as to position either filter 73 or filter 75 in the beam 56. The actuator 77 is controlled by the controller 101 via a signal line 125. The filter 73 is positioned in beam path 56 in the first mode of operation of the surgical microscope 1. The Filter 73 allows red light, green light and blue light to pass, such that object 9 is illuminated by light which is perceived as a substantially white light by the user.

The light emanating from the object 9 is detected by the camera system 25, wherein the camera chips 35, 36 and 37 detect red light, green light and blue light, respectively. Image signals generated by the camera chips 35, 36 and 37 are supplied to the controller 101 via lines 124. The controller 101 generates image data of a combined color image based on the supplied image signals. These image data can be displayed on a display.

The display may, for example, include a monitor 103 connected to the controller 101 to display a microscopic color image of the object 9. The display may, for example, include an LCD display 104 to generate a representation of the image. The representation is transmitted by optics 105 and superimposed with the beam path of the imaging optics 3 via a partially transmissive mirror 107, such that the user may see, by looking into the ocular 17, the image displayed on the display 104 in superposition with the optical image of the object 9 transmitted via the beam 15 from the objective lens 5 to the ocular 17.

A partially transmissive mirror 81 or a prism branches off a part of the light of the beam 14, which is then supplied to a second camera system 83 comprising a dichroic beam splitter 84 and three camera chips 85, 86 and 87, to which red light, green light and blue light is supplied to by the dichroic beam splitter 84. An infrared blocking filter 88 is permanently positioned in a beam path upstream of an input port of the dichroic beam splitter 84. Output signals of the camera chips 85, 86 and 87 are transmitted to the controller 101 via signal lines 89.

The display may include, for example, a head mounted display 113, which can be attached to a head of a user by an attachment band 111 or the like and comprises a display 114 for a right eye of the user and a display 115 for a left eye of the user. The head mounted display is connected to the controller 101 via a signal line 112. The controller 101 supplies the image data obtained by the camera system 25 to the display 114 and the controller 101 supplies the image data obtained by the camera system 83 to the display 115, such that the user can perceive a stereoscopical image of the object 9 via the display 113.

The user may instruct the controller 101 to change the mode of operation from the first mode of operation to the second mode of operation by a suitable command. The command can be supplied to the controller 101 via an input device, such as a button 121, a keyboard or a microphone receiving a corresponding voice signal, or some other input device and method.

Upon receipt of a signal indicating a desired change of the mode of operation, the controller 101 controls the actuator 45 via line 123 to remove the first blocking filter 27 from the beam 23. In the illustrated example, the first blocking filter blocks infrared light, and as the first blocking filter is removed from the beam in the second mode of operation, the camera system 25 can also obtain infrared images.

Further, the controller 101 controls the actuator 77 such that the second blocking filter 75 is positioned in the beam 23 and filter 73 is positioned outside of the beam 56. In the illustrated embodiment, the blocking filter 75 is a fluorescence excitation filter configured to allow merely such light to traverse the filter which is capable of exciting a fluorescence of a fluorescent dye or a precursor thereof chosen beforehand. Such excitation light is included in a frequency spectrum generated by the light source 53 and may traverse the filter 75 to be supplied to the object 9. The fluorescent dye or precursor thereof may, according to an example, comprise indocyanine green (ICG). Fluorescence light generated by the fluorescent dye comprises light of an infrared wavelength range and is imaged by the microscopy optics 3 onto the camera chips of the camera system 25. Since the filter 27, which is an infrared blocking filter in the illustrated example, is removed from the beam 23 in the second mode of operation, supply of infrared light to the camera system 25 is not prevented, and the camera system can detect a fluorescence image of the object 9, accordingly.

As explained above, the dichroic beam splitter 33 is configured to supply infrared light to merely the one camera chip 36, such that the camera chip 36 can detect the fluorescence image of the object 9. The detected fluorescence image may have relatively high signal-to-noise ratio, even if the generated infrared fluorescence light has low intensity.

The fluorescence image is transmitted to the controller 101 via lines 124 and may be displayed via the display 104 as a visual image, such that the user may perceive the infrared image as a visual image when viewed by the ocular 17. Likewise, the controller 101 may display the infrared image on the display 103 or on the displays 114, 115 of the head mounted display 113. The infrared image may be displayed as a greyscale image, wherein brighter grey values represent higher infrared intensities. For example, a maximum infrared intensity may be represented by the color white. It is also possible to display the infrared image inverted to this, wherein darker grey values represent higher infrared intensities.

Figure 3:
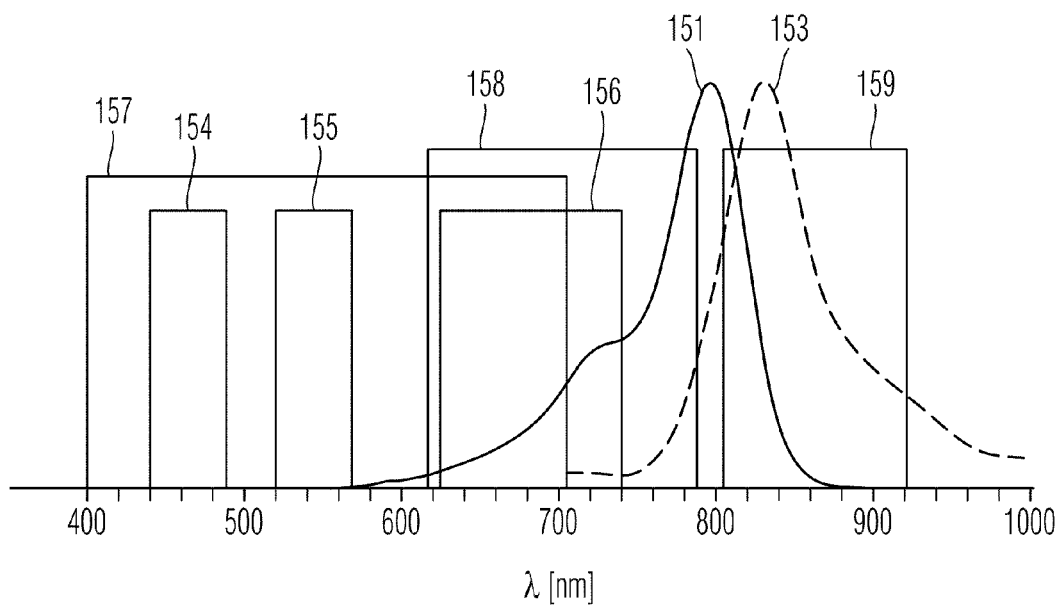
FIG. 3 shows a schematic representation of spectra and spectral ranges which may occur in the surgical microscope shown in FIG. 1.

FIG. 3 shows a schematic representation of properties depending on wavelengths of optical elements of the surgical microscope shown in FIG. 1.

A continuous line 151 in FIG. 3 represents an excitation efficiency of the fluorescent dye ICG depending on a wavelength k in arbitrary units, while a broken line 153 represents a fluorescence spectrum of the fluorescent dye in arbitrary units.

A line 154 in FIG. 3 represents very schematically a transmission characteristic for blue light of the dichroic beam splitter 33 from the input port 31 to the output port 34 towards the camera chip 37 which detects blue light. A line 155 in FIG. 3 represents very schematically a transmission characteristic for green light of the dichroic beam splitter 33 from the input port 31 to the output port 32 towards the camera chip 36 which detects green light. A line 156 in FIG. 3 represents very schematically a transmission characteristic for red light of the dichroic beam splitter 33 from the input port 31 to the output port 30 towards the camera chip 35, which detects red light.

These transmission characteristics of the dichroic beam splitter 33 are very schematically illustrated by the lines 154, 155 and 156 in FIG. 3 inasmuch as the characteristics do not overlap. Accordingly, it is clarified that the colors red, green and blue are colors that are different from each other. However, in practice, the beam splitter may be configured such that the characteristics 154, 155 and 156 partially overlap in their wavelength ranges. This may have an effect such that, for example, a main part of light of a wavelength of 450 nm is incident on the camera chip 37 while a smaller part of light of this wavelength is also received by the camera chip 36. Likewise, light of a wavelength of 600 nm, for example, may be received by both camera chips 35 and 36 in about equal parts.

In FIG. 3, a line 157 represents very schematically a transmission characteristic of the filter 73, which is positioned in the illumination light beam 56 in the first mode of operation. The filter 73 allows blue light, green light and red light to pass, such that a color impression of the object 9 perceived by the user is a color impression corresponding to white light. However, the filter 73 is configured such that visible light of relatively long wavelengths, such as above about 705 nm, is not allowed to pass. This light could be detected by the camera chip 35, which receives red light, as illustrated by the characteristic represented by line 156. In the illustrated example, the filter 73 used to prevent red light of long wavelengths in the illumination light beam to be supplied to the object since this light might unnecessarily heat the object 9.

In FIG. 3, a line 158 represents very schematically a transmission characteristic of filter 75 which is positioned in the beam path of the illumination light beam 56 in the second mode of operation in order to observe fluorescence. The filter 75 does not allow blue light (see characteristic 154) and green light (see characteristic 155) to pass, while red light of a wavelength range from about 615 nm to about 790 nm may pass filter 75 to be incident on the object 9 to excite a fluorescence of the fluorescent dye.

In FIG. 3, a line 159 represents very schematically a transmission characteristic for infrared light of the dichroic beam splitter 33 from the input port 31 to the output port 32 towards the camera chip 36 which also receives the green light if it is supplied to the input port 31 of the beam splitter 33.

Due to the presence of the filter 75 in the illumination beam path in the second mode of operation, green light is substantially not contained in the illumination light in the second mode of operation for detecting fluorescence. This gas a consequence, that green light is substantially not supplied to the camera chip 36. However, camera chip 36 may detect infrared light which is generated by the fluorescence, such that the controller 101 may obtain an infrared fluorescence image of the object by the camera system 25. The infrared image is mainly detected by the camera chip 36 which is arranged to also detect the green light.

In the above explained embodiment, the dichroic beam splitter 33 is configured to supply the infrared light to camera chip 36 to which the green light is also supplied to. However, it is also possible to modify the dichroic beam splitter 33 so as to supply the infrared light to the camera chip 37 to which the blue light is also supplied to. Consequently, the blue light is removed from either the beam path 23 upstream of the input port 31 of the dichroic beam splitter 33 or from the beam path upstream of the object 9.

In the illustrated example, the first blocking filter 27 is positioned in the beam 23 upstream of the input port 31 of the dichroic beam splitter 33 of the camera system 25. However, the first blocking filter can be omitted in other examples of the surgical microscope.

Figure 4:
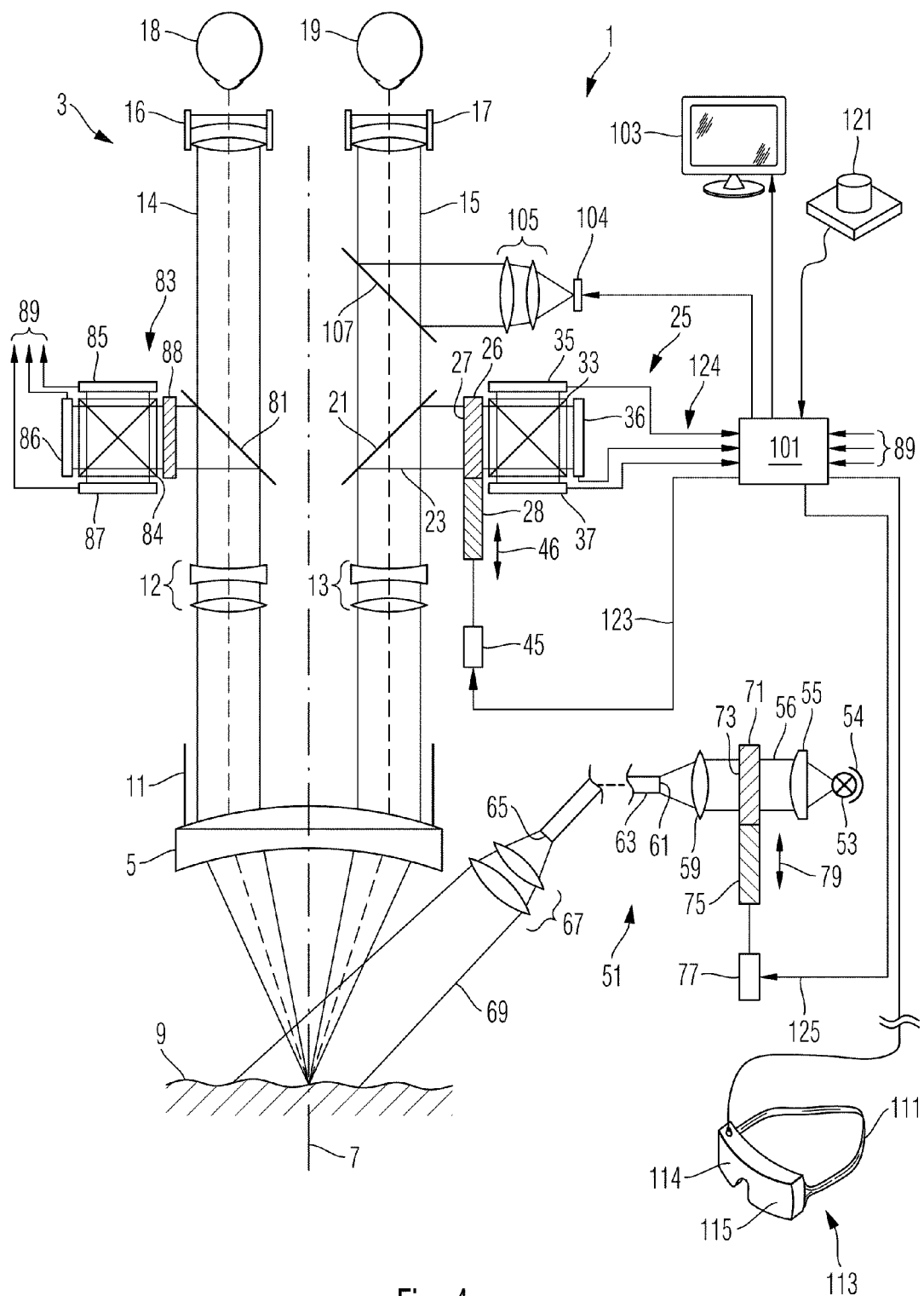
FIG. 4 shows a schematic representation of beam paths in a surgical microscope according to a second embodiment.

FIG. 4 schematically illustrates beam paths of a surgical microscope 1 according to a further embodiment.

The surgical microscope illustrated in FIG. 4 has a configuration and provides a function similar to the surgical microscope illustrated with reference to FIGS. 1 to 3 above. The surgical microscope of FIG. 4 mainly differs from the surgical microscope illustrated above in that filter plate 26 arranged in a beam path upstream of camera system 25 includes a first blocking filter 27 and a second blocking filter 28. The first blocking filter 27 is configured to block infrared light from passing through the filter 27. The first filter 27 is positioned in a beam 23 imaging an object 9 onto camera chips 35, 36 and 37 in a first mode of operation of the surgical microscope 1 in which a normal light image of the object 9 is detected with the camera system 25. For this purpose, the first blocking filter 27 blocks infrared light such that infrared light does not contribute to formation of the image detected by the camera system 25.

The second blocking filter 28 is positioned in the beam 23 in the second mode of operation in which an infrared image is detected by the camera system 25. As illustrated above with reference to FIGS. 1 to 3, a dichroic beam splitter 33 of the camera system 25 has a configuration such that infrared light incident on an input port of the dichroic beam splitter 33 is supplied to the camera chip 36 via an output port of the dichroic beam splitter 33 to which also green light is supplied. Camera chip 36 detects the green light image in the first mode of operation and the infrared light image in the second mode of operation.

In the embodiment illustrated with reference to FIG. 4, light for excitation of a fluorescence is supplied to the object 9 in the second mode of operation in which the infrared fluorescence image is to be detected by camera chip 36. However, also white light is supplied to the object 9 in the second mode of operation such that a white light image can also be detected by a suitable camera, such as camera system 83. Other than in the embodiment illustrated with reference to FIG. 1, the second blocking filter 28 is positioned in the beam 23 in the second mode of operation of the surgical microscope 1 illustrated in FIG. 4. The second blocking filter 28 allows infrared light, red light and blue light to traverse the filter, such that camera chip 35 can detect a red light image of the object 9, camera chip 37 can detect a blue light image of the object 9, and camera chip 36 can detect the infrared light image of the object, while green light is blocked by the second blocking filter 28 from being supplied to the input port of the dichroic beam splitter 33 such that green light is not incident on camera chip 36 which detects the infrared light image in this second mode of operation. Therefore, the camera system 25 illustrated in FIG. 4 is capable of detecting the red light image of object 9 and an incomplete normal light image of the object 9. The incomplete normal light image is composed only of the two color components red and blue, and the green color component is missing from this incomplete normal light image. It has been found that such incomplete normal light image still provides valuable information to a user which may receive both the infrared image and the incomplete normal light image from only one camera system 25 having three camera chips 35, 36 and 37.

This camera system 25 can be used in two different modes of operation: In the first mode of operation, in which blocking filter 27 is disposed in the beam path upstream of the dichroic beam splitter 33, the camera system 25 detects the (complete) normal light image, wherein blocking filter 27 prevents infrared light from being supplied to camera chip 36. In the second mode of operation, in which the second blocking filter 28 is disposed in the beam path upstream of the dichroic beam splitter 33, the camera system 25 detects both the infrared image and the incomplete normal light image, wherein the second blocking filter 28 prevents green light from being supplied to the camera chip 36.

Figure 5:
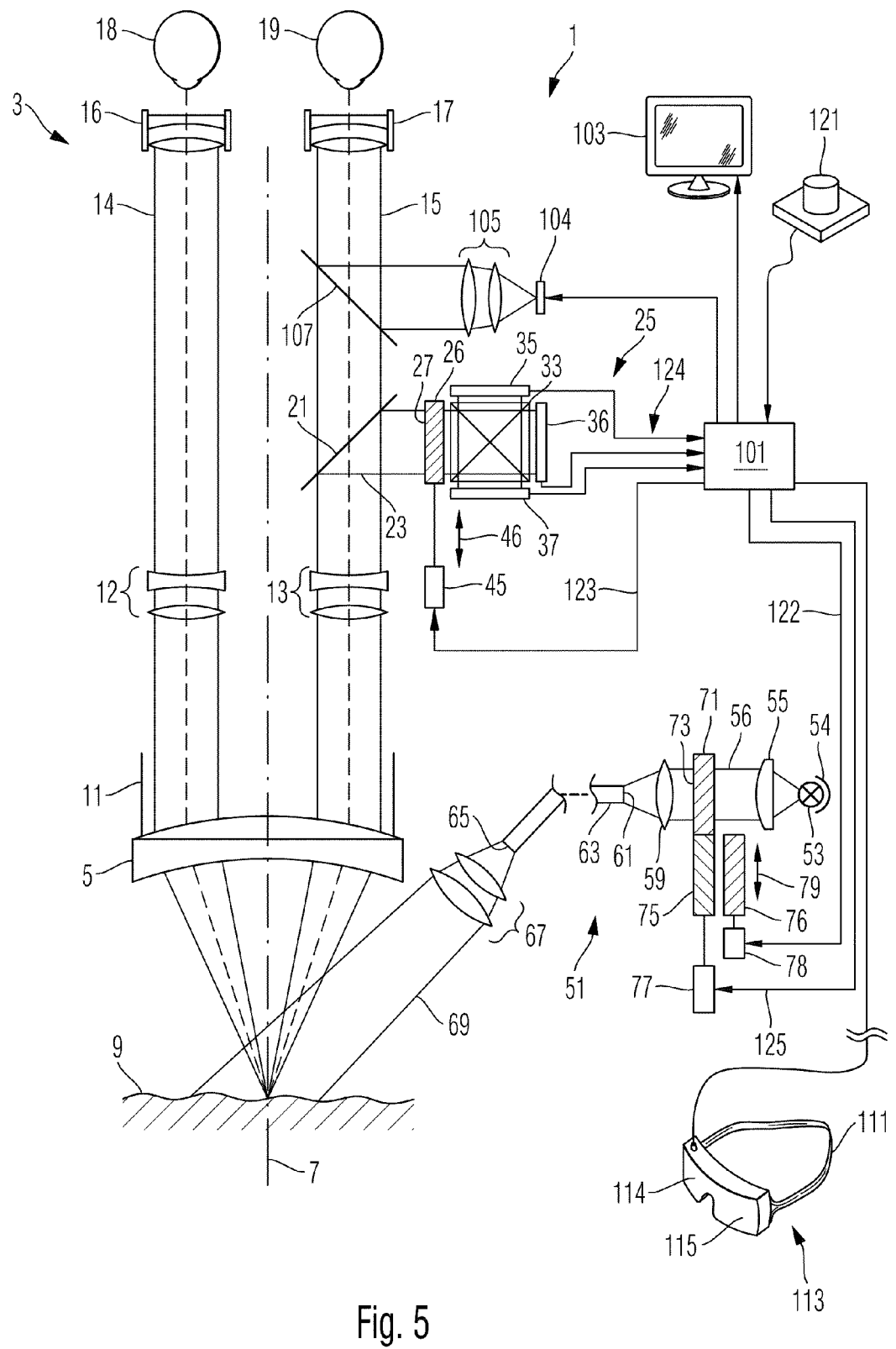
FIG. 5 shows a schematic representation of beam paths in a surgical microscope according to a third embodiment.

FIG. 5 illustrates a further embodiment of a surgical microscope 1 which is similar to that illustrated with reference to FIG. 4 in that both an infrared image 25 and an incomplete normal light image can be recorded by a same camera system 25. The camera system 25 comprises three camera chips, wherein a camera chip 35 is arranged to detect a red light image of an object 9, a camera chip 37 is arranged to detect a blue light image of the object 9, and a camera chip 36 is arranged to detect a green light image in a first mode of operation of the surgical microscope 1 and an infrared light image in a second mode of operation of the surgical microscope 1.

The surgical microscope 1 comprises a filter 76 connected to an actuator 78 which is controlled by the controller 101 via a signal line 122. The actuator 78 is configured to position the filter 76 under the control of controller 101 outside of the illumination beam 56 in the first mode of operation and in the illumination beam 56 in the second mode of operation. The filter 76 is a blocking filter configured to block green light and to not block red light, blue light and light suitable for exiting a fluorescence.

In the first mode of operation, the filter 76 is not positioned in the beam 56 such that white light is supplied to the object. The filter 27 is positioned in the beam path upstream of the camera system and prevents infrared light from detection by the camera chip 36. The three camera chips 35, 36 and 37 detect a (complete) normal light image of the object 9 in the first mode of operation, accordingly.

In the second mode of operation, the filter 76 is positioned in the beam 56, such that green light is not supplied to the object 9. In this mode of operation, green light does substantially not emerge from the object 9 and is substantially not contained in the light of beam 23 supplied to the camera system 29. Therefore, the camera chip 36 does substantially not receive any green light. The camera chip 36 may then detect the infrared image as illustrated above.

The camera system 83 which is used in the embodiments illustrated above with reference to FIG. 1 for obtaining a normal light image in the second mode of operation can be omitted in the embodiments as shown in FIG. 5 if one is satisfied with a quality of the incomplete normal light image obtained when the filter blocking the green light is used in a beam path upstream of the camera system or in a beam path of the illuminating light.

In the embodiments illustrated above, the camera chip receiving the green light image in the first mode of operation is also the camera chip receiving the infrared image in the second mode of operation. It is to be noted that also other camera chips, such as the camera chip receiving the blue light in the first mode of operation and the camera chip receiving the red light in the first mode of operation, may be arranged to also receive the infrared light in the second mode of operation wherein the camera chip receiving the green light in the first mode of operation does not receive the infrared light in the second mode of operation.

A further embodiment will be illustrated with reference to FIGS. 1 to 3 below. The surgical microscope according to this embodiment has a similar structure as the surgical microscope illustrated above with reference to FIGS. 1 to 3.

According to this embodiment, the filter 75, which is positioned in the beam of the illumination system 51 in order to excite the fluorescence in the second mode of operation, has a transmission characteristic which is different from the transmission characteristic according to line 158 in FIG. 3. The transmission characteristic is configured such that the filter allows light of a wavelength range from about 400 nm to about 780 nm to pass, so as to supply to the object 9 both excitation light for exciting a fluorescence and normal light. Therefore, it is possible for the user to perceive a normal light image of the object through the oculars 16 and 17. Likewise, the camera system 83 having the infrared blocking filter 88 in the beam path upstream of the input port of beam splitter 84 may detect a normal light image of the object, which can be displayed on one of the displays 103, 104, 114 and 115 or some other display. In this embodiment, the first blocking filter 27, which is positioned in the beam 23 upstream of the input port of the beam splitter 33 of the camera system 25, is configured to have a transmission characteristic as illustrated by line 159 of FIG. 3. Then, the camera system 25 may obtain the fluorescence image of the object, which may be displayed as a black and white image or grey scale image on one of the displays 103, 104, 114 and 115. It is also possible to display the fluorescence image in superposition with the normal light image on the display. Furthermore, the fluorescence image may be displayed in one color, such as green, wherein higher fluorescent light intensities may be displayed by a brighter green color and lower fluorescent light intensities may be displayed by a darker green color, or vice versa.

In the context of the embodiments described so far, it is further possible to combine several pixels, for example, 2, 4 or more pixels of the camera into groups and to accumulate the radiation intensities detected by the grouped pixels in order to obtain an intensity value of an image element of the detected image. Conventionally, such a procedure is called "pixel-binning" and serves to obtain a better signal to noise ratio in the entire image when merely low light intensities received by each individual pixel of the camera chip occur.

The embodiments described above may be further modified by exciting the fluorescent dye with a light source, for example, a light emitting diode (LED) or a laser diode, which is different from the light source generated by the normal illumination light. Therefore, relative intensities of fluorescent and non-fluorescent parts of tissue under examination may be controlled independently from each other and may be adjusted to the individual needs of the user.

While the present invention has been shown and described herein in what is believed to be the most practical and preferred embodiments, it is recognized that many alternatives, modifications, and variations will be apparent to those skilled in the art. Accordingly, the exemplary embodiments of the invention set forth herein are intended to be illustrative and not limiting in any way. Various changes may be made without departing from the spirit and scope of the present invention as defined in the following claims.

What is claimed is:

1. A surgical microscope for observing an infrared fluorescence, the surgical microscope comprising:
    a camera system having an input port, a dichroic beam splitter and first, second and third camera chips, wherein the dichroic beam splitter is configured to direct red light received at the input port mainly towards the first camera chip via a first output port of the beam splitter, to direct green light received at the input port mainly towards the second camera chip via a second output port of the beam splitter, to direct blue light received at the input port mainly towards the third camera chip via a third output port of the beam splitter, and to direct infrared light received at the input port such that a first intensity of the infrared light directed towards a selected camera chip among the first, second and third camera chips to be larger than a sum of intensities of the infrared light received by others than the selected camera chip among the first, second and third camera chips;
    microscopy optics configured to optically image an object area onto the camera chips of the camera system; and
    a display system configured to display images based on light intensities detected by the camera chips of the camera system.

2. The surgical microscope according to claim 1 wherein the selected camera chip is one of the second and third camera chips.

3. The surgical microscope according to claim 1 further comprising a first blocking filter substantially blocking infrared light, wherein the blocking filter is operable to be selectively positioned inside or outside of an imaging beam path between the object area and the input port of the dichroic beam splitter.

4. The surgical microscope according to claim 3 further comprising:
    a second blocking filter substantially blocking at least one of red light, green light and blue light, wherein the second blocking filter is operable to be selectively positioned inside or outside of an imaging beam path between the image area and the input port of the dichroic beam splitter; and
    an actuating system coupled to the first and second blocking filters and configured such that only one of the first and second blocking filters is positioned in the imaging beam path at a given time.

5. The surgical microscope according to claim 3 further comprising:
    an illumination system configured to direct at least one illumination light beam towards the object area;
    a third blocking filter substantially blocking at least one of red light, green light and blue light, wherein the third blocking filter is operable to be selectively positioned inside or outside of a beam path of the illumination system; and
    an actuating system coupled to the first and third blocking filters and configured such that only one of the first and third blocking filters is positioned in the imaging beam path and the beam path of the illumination system, respectively, at a given time.

6. The surgical microscope according to claim 1 further comprising a
    blocking filter substantially blocking at least one of red light, green light and blue light, wherein the blocking filter is operable to be selectively positioned inside or outside of an imaging beam path between the object area and the input port of the dichroic beam splitter.

7. The surgical microscope according to claim 1 further comprising:
    an illumination system configured to direct at least one illumination light beam towards the object area; and
    a blocking filter substantially blocking at least one of red light, green light and blue light, wherein the blocking filter is operable to be selectively positioned inside or outside of a beam path of the illumination system.

8. The surgical microscope according to claim 1 wherein the dichroic beam splitter is further configured such that, when the red light, which is mainly directed towards the first camera chip, is supplied to the input port of the dichroic beam splitter, a ratio of a light intensity detected by the first detector and a sum of a light intensity detected by the second detector and a light intensity detected by the third detector is greater than one of 1.8, 2.5 and 3.0;
    wherein the dichroic beam splitter is further configured such that, when the green light, which is mainly directed towards the second camera chip, is supplied to the input port of the dichroic beam splitter, a ratio of a light intensity detected by the second detector and a sum of a light intensity detected by the first detector and a light intensity detected by the third detector is greater than one of 1.8, 2.5 and 3.0; and
    wherein the dichroic beam splitter is further configured such that, when the blue light, which is mainly directed towards the third camera chip, is supplied to the input port of the dichroic beam splitter, a ratio of a light intensity detected by the third detector and a sum of a light intensity detected by the first detector and a light intensity detected by the second detector is greater than one of 1.8, 2.5 and 3.0.

9. The surgical microscope according to claim 1 wherein the dichroic beam splitter is further configured such that, a ratio of the first intensity detected by the selected camera chip and the sum of light intensities detected by the other of the first, second and third camera chips is greater than one of 1.8, 2.5 and 3.0.

10. The surgical microscope according to claim 1 wherein the infrared light includes light of a wavelength range from 800 nm to 930 nm.

11. The surgical microscope according to claim 1 wherein the blue light includes light of a wavelength range from 440 nm to 490 nm, wherein the green light includes light of a wavelength range from 520 nm to 570 nm, and wherein the red light includes light of a wavelength range from 625 nm to 740 nm.

12. A microscopy method comprising:
   operating a microscope in a first mode of operation, the first mode of operation comprising:
      supplying light including red, green and blue light to an object;
      supplying red light emanating from the object to a first camera chip,
      supplying green light emanating from the object to a second camera chip, and
      supplying blue light emanating from the object to a third camera chip; and
   operating the microscope in a second mode of operation, the second mode of operation comprising:
      exciting a fluorescence at the object, and
      supplying infrared light generated by the fluorescence from the object such that a first intensity of the infrared light directed towards a selected camera chip from the first, second, or third camera chips to be larger than a sum of intensities of the infrared light received by others than the selected camera chip among the first, second and third camera chips.

13. The microscopy method according to claim 12 further comprising blocking infrared light from being supplied to the selected camera chip in the first mode of operation only.

14. The microscopy method according to claim 12 further comprising blocking light having wavelengths greater than 700 nm and smaller than 805 nm from being supplied to one of the first, second, or third camera chips in the second mode of operation.

15. The microscopy method according to claim 12 further comprising blocking one of red, green, or blue light from being supplied to one of the first, second, or third camera chips in the second mode of operation.

16. The microscopy method according to claim 12 further comprising supplying at most two of red light, green light, or blue light to the object in the second mode of operation.

17. The microscopy method according to claim 12 wherein the method is performed using the surgical microscope according to claim 1.

* * * * *